(12) United States Patent
Wang et al.

(10) Patent No.: US 11,883,737 B2
(45) Date of Patent: Jan. 30, 2024

(54) METHODS AND APPARATUSES FOR GAME STATE BASED NETWORK INTERFACE MANAGEMENT

(71) Applicant: QUALCOMM Incorporated, San Diego, CA (US)

(72) Inventors: Hanyang Wang, Beijing (CN); Ajit Chourasia, San Diego, CA (US); Zheng Fang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/032,263

(22) Filed: Sep. 25, 2020

(65) Prior Publication Data
US 2021/0093953 A1    Apr. 1, 2021

Related U.S. Application Data

(60) Provisional application No. 62/907,303, filed on Sep. 27, 2019.

(51) Int. Cl.
| | | |
|---|---|---|
| A63F 13/00 | (2014.01) | |
| A63F 13/332 | (2014.01) | |
| A63F 13/45 | (2014.01) | |
| G06F 16/901 | (2019.01) | |
| A63F 13/69 | (2014.01) | |
| H04L 101/663 | (2022.01) | |

(52) U.S. Cl.
CPC .......... *A63F 13/332* (2014.09); *A63F 13/45* (2014.09); *A63F 13/69* (2014.09); *G06F 16/9017* (2019.01); *H04L 2101/663* (2022.05)

(58) Field of Classification Search
CPC .......... A63F 13/77; A63F 13/20; A63F 13/30; A63F 13/335; A63F 13/71
See application file for complete search history.

(56) References Cited

U.S. PATENT DOCUMENTS

| | | | |
|---|---|---|---|
| 10,653,966 B1 * | 5/2020 | Paradise | H04L 67/1091 |
| 2007/0008925 A1 | 1/2007 | Dravida et al. | |
| 2007/0270135 A1 | 11/2007 | Gaschler | |
| 2011/0124406 A1 * | 5/2011 | Blackburn | G07F 17/323 463/25 |
| 2013/0060653 A1 | 3/2013 | Sharkey | |
| 2013/0252713 A1 * | 9/2013 | Nelson | G07F 17/3225 463/25 |

OTHER PUBLICATIONS

International Search Report and Written Opinion—PCT/US2020/052956—ISA/EPO—dated Nov. 27, 2020.

* cited by examiner

*Primary Examiner* — David L Lewis
*Assistant Examiner* — Eric M Thomas
(74) *Attorney, Agent, or Firm* — Seyfarth Shaw, LLP

(57) ABSTRACT

Certain aspects of the present disclosure provide techniques for game-state sensitive network interface selection. An example method that may be performed by a user equipment (UE) includes determining a game state based on game state information; determining a suitable network interface based on the determined game state; and switching to the determined suitable network interface if the determined suitable network interface is different from a current network interface.

30 Claims, 9 Drawing Sheets

METHODS AND APPARATUSES FOR GAME STATE BASED NETWORK INTERFACE MANAGEMENT

CROSS-REFERENCE TO RELATED APPLICATION(S)

This application claims the benefit of U.S. Provisional Application Ser. No. 62/907,303, entitled "METHODS AND APPARATUSES FOR GAME STATE BASED NETWORK INTERFACE MANAGEMENT" and filed on Sep. 27, 2019, which is expressly incorporated by reference herein in its entirety.

BACKGROUND

Field of the Disclosure

Aspects of the present disclosure relate to wireless communications, and more particularly, to techniques for game state dependent network interface management for game application performance improvement.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies. One major driving force behind the increased mobile broadband access is online multiplayer gaming applications.

Online gaming on smart phones has become a big industry in some countries such as China and India and has become a differentiator for a wireless service provider. The gaming communication is becoming an area attracting major investment from the service providers and equipment vendors alike. Any game application performance improvement is highly desirable.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance for gaming applications on UEs, especially the online gaming application involving multiple players participating in the game from their respective UEs.

Certain aspects provide a method for wireless communication performed by a user equipment (UE). The method generally includes determining a game state based on at least one game state indicator, determining a suitable network interface based on the determined game state, and switching to the determined suitable network interface if the determined suitable network interface is different from the current network interface in use.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, some identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
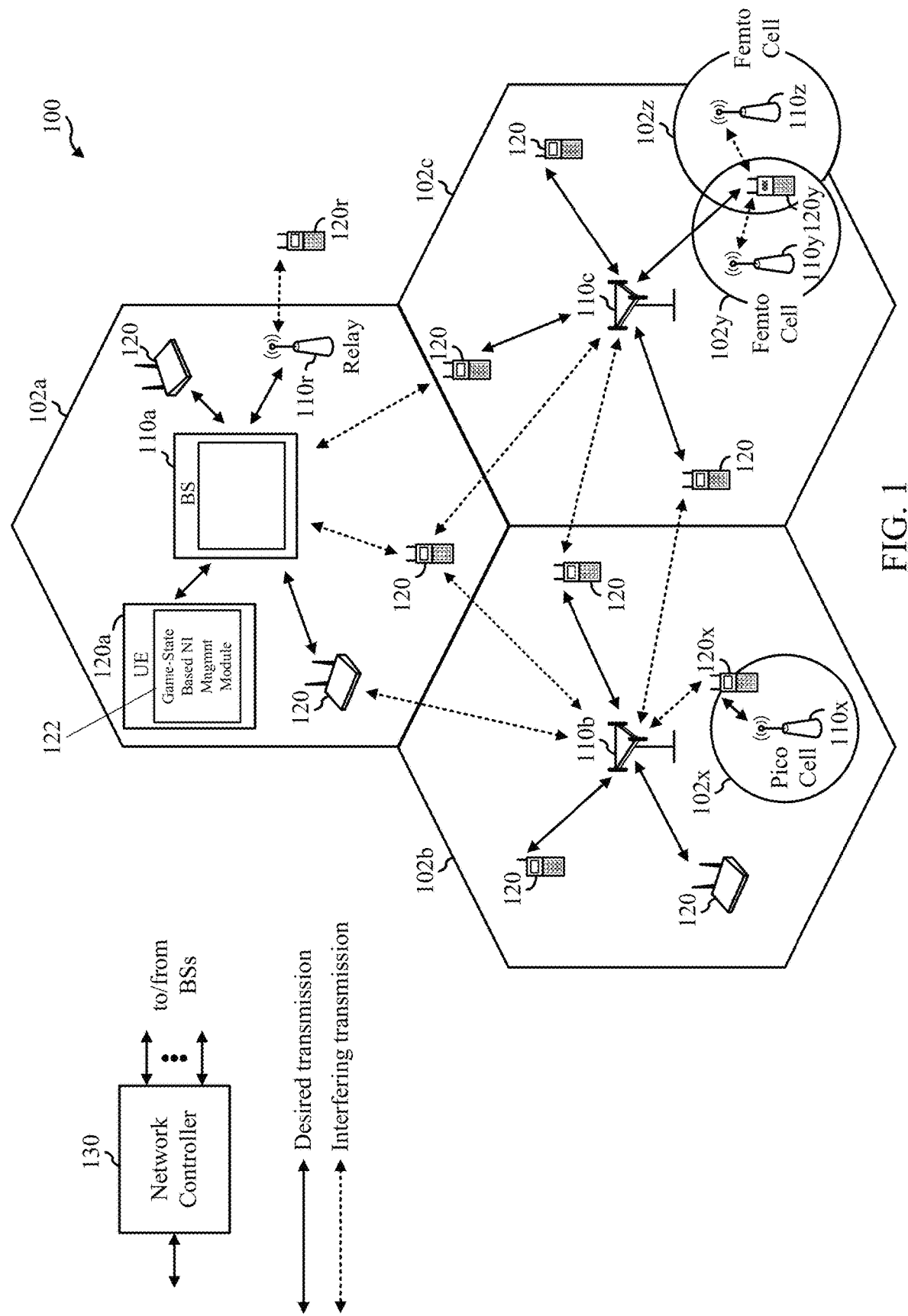
FIG. 1 is a block diagram conceptually illustrating an example telecommunications system, in accordance with certain aspects of the present disclosure.

Aspects of the present disclosure provide apparatus, methods, processing systems, and computer readable mediums for game-state dependent network interface management. Online gaming on smart phones has become big industry and a key differentiator for competition among wireless service providers. The gaming communication is becoming an area attracting major investment and innovation from the service provider and equipment vendors alike. One type of online gaming that is becoming increasingly popular is Multi party Online Battle Arena (MOBA) that has multiple stages or states. From the perspective of network connectivity, each game state may have different characteristics and may need to be optimized differently. For example, a game state may be a game starting, a game version checking, a game update, a player authentication, a game loading, game selection, a state for joining a gaming room, inviting a user, a game character/avatar choosing, game playing or other game state. Single network interface/solution may not be optimal for all the game states. In one aspect, the game update state may need a network interface with a high-throughput while the game playing state may need a network interface with least latency pipe. Described herein are methods and apparatus for game state dependent network interface determination and management.

The following description provides examples of game state dependent network interface management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. In one aspect, an apparatus may be implemented, or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G new radio (NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP).

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. In one aspect, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured with a game state based network interface (NI) management module. As shown in FIG. 1, the UE 120a includes a game state based NI management module 122. The module 122 may be configured to determine a game state based on a game state indicator, determine a suitable network interface based on the determined game state, and add or switch to the determined suitable network interface if the determined suitable network interface is different from a current network interface in use, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
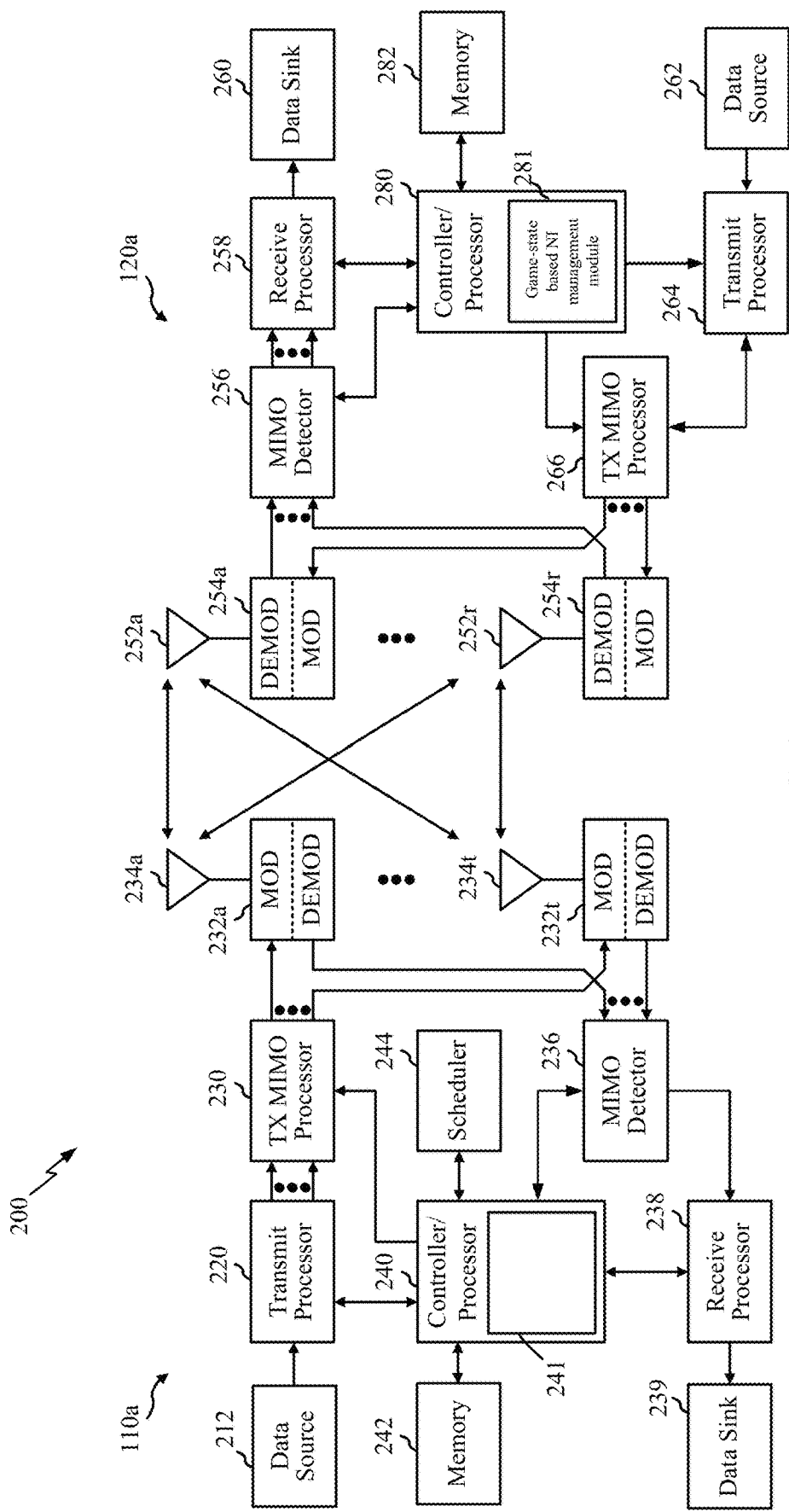
FIG. 2 is a block diagram illustrating an example architecture of a distributed radio access network (RAN), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The controller 280 may include a game state dependent network interface selection module 281. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240. The controller 240 may include a game state dependent network interface selection module 241 to support the UE side game state dependent network interface selection module 281.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a game state based network interface management module 281. The module 281 is configured to determine a game state based on game state indicator, to determine a suitable network interface based on the determined game state; and to add or switch to the determined suitable network interface if the determined suitable network interface is different from a current network interface. Although shown at the Controller/Processor, other components of the UE 120a and BS 110a may be used performing the operations described herein.

According to aspects of the present disclosure, a UE may automatically determine a game state based on a game state indicator; determine a suitable network interface based on the determined game state; and add or switch to the determined suitable network interface if the determined suitable network interface is different from a current network interface in use.

In aspects of the present disclosure, a game state based NI management becomes more and more important to handset users for improvement of their online game experiences. In addition, data plans have become less expensive, and gaming applications can only become more popular and a key distinguishing feature for a carrier, and thus the value of the disclosed techniques can be expected to increase.

According to aspects of the present disclosure, determining a game state based on a game state indicator, determining a suitable network interface based on the determined game state, and adding/switching to the determined network interface may be extendable by combining artificial intelligence (AI) and/or context awareness of the UE.

In aspects of the present disclosure, a UE may determine a game state based on a game state indicator and determine a suitable network interface that support various cellular technologies, including $2^{nd}$ Generation (2G), $3^{rd}$ Generation (3G), $4^{th}$ Generation (4G or 4G LTE), $5^{th}$ Generation (5G, also referred to as New Radio (NR)), and even future $6^{th}$ Generation (6G) and beyond technologies.

According to aspects of the present disclosure, a UE's determination of a game state based on a game state indicator; and determination of a suitable network interface based on the determined game state is not dependent on any particular cellular air interface technology mentioned above. Thus, as long as there is diversity of coverage and/or service quality and/or even data plan consumption status among carriers, the disclosed techniques can provide value to users engaging in playing online multi-stage multi-player games.

Figure 3:
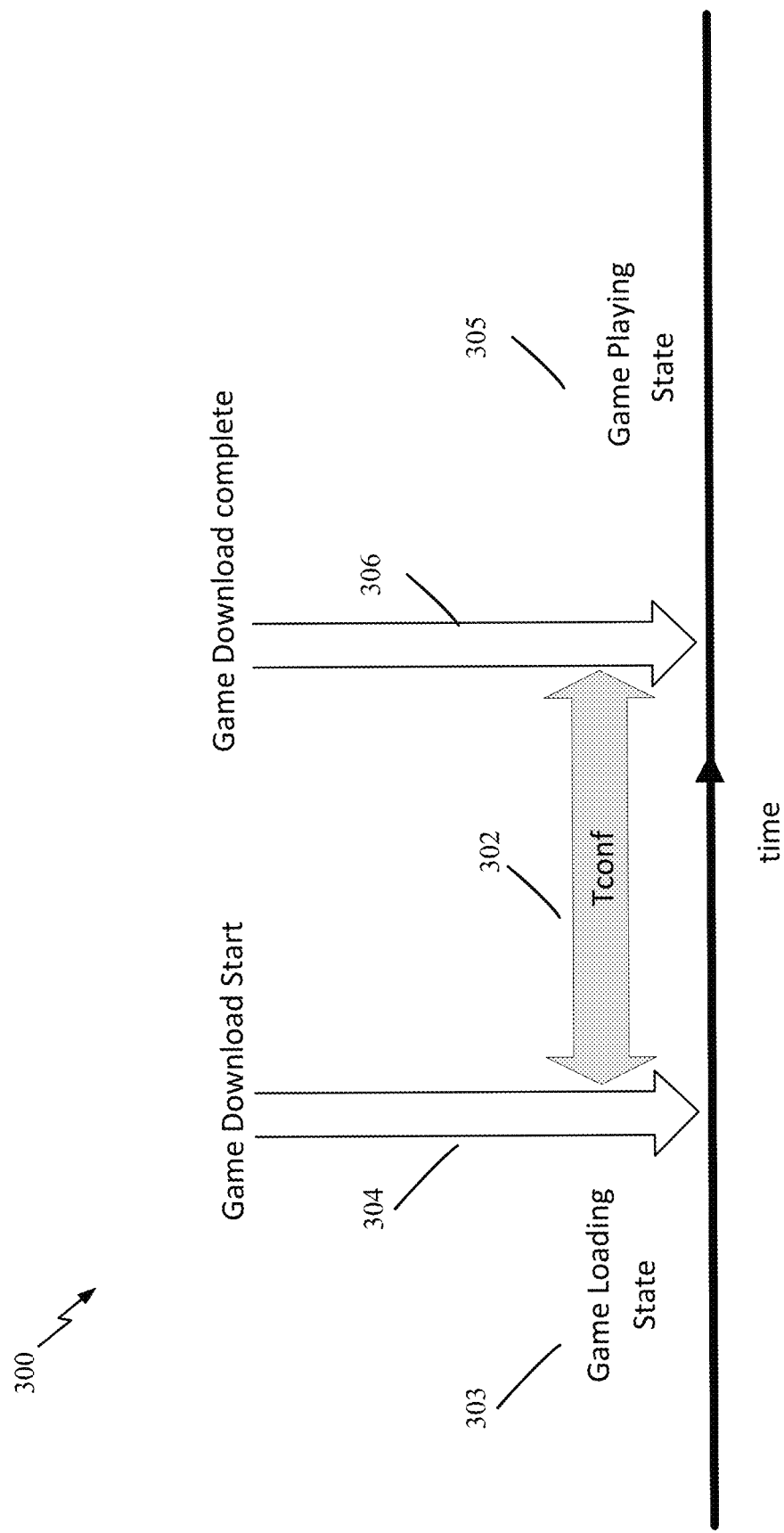
FIG. 3 shows some exemplary game states with a timer, according to aspects of the present disclosure.

FIG. 3 shows an exemplary game states with a timer, according to aspects of the present disclosure. One issue to be addressed is how to demine a game state based on a game state indicator. In one example aspect, A game specific timer is one example game state indicator.

In one example aspect, FIG. 3 illustrates an example 300 of determining a game state based on a game state indicator. In this aspect, the game state indicator is a timer of a game application. The example 300 includes a game loading state 303, which may include a download start sub-state 304 on the time axis 301, a timer period (Tconf) 302 and a game playing state 305 with a sub state game download complete 306. The timer 302 may be configured based on a specific game application. In one example aspect, the timer 302 may be sufficiently long to accommodate aggregation of multiple network interfaces. In yet another example aspect, the timer 302 may be a function of the number of times a game is loaded. In one aspect, the initial loading may take longer than a subsequent loading of a game. In another example aspect, the timer 302 may be derived based on the network throughput and on the approximate size of a game binary.

Accordingly, when the timer 302 serves as a game state indicator, the timer expiring indicates the start of a new game state. In one aspect, in an example aspect, when timer 302 expires, a signal is sent to the Game-State Based NI Management Module of the UE, and UE may update its game state from the game loading state to a game playing state 305.

Timer 302 as shown in FIG. 3, is only an example timer. Other timers may be configured to serve as a game state indicator. In one aspect, there may be a timer for game loading, game update checking, player selection and other.

Figure 4:
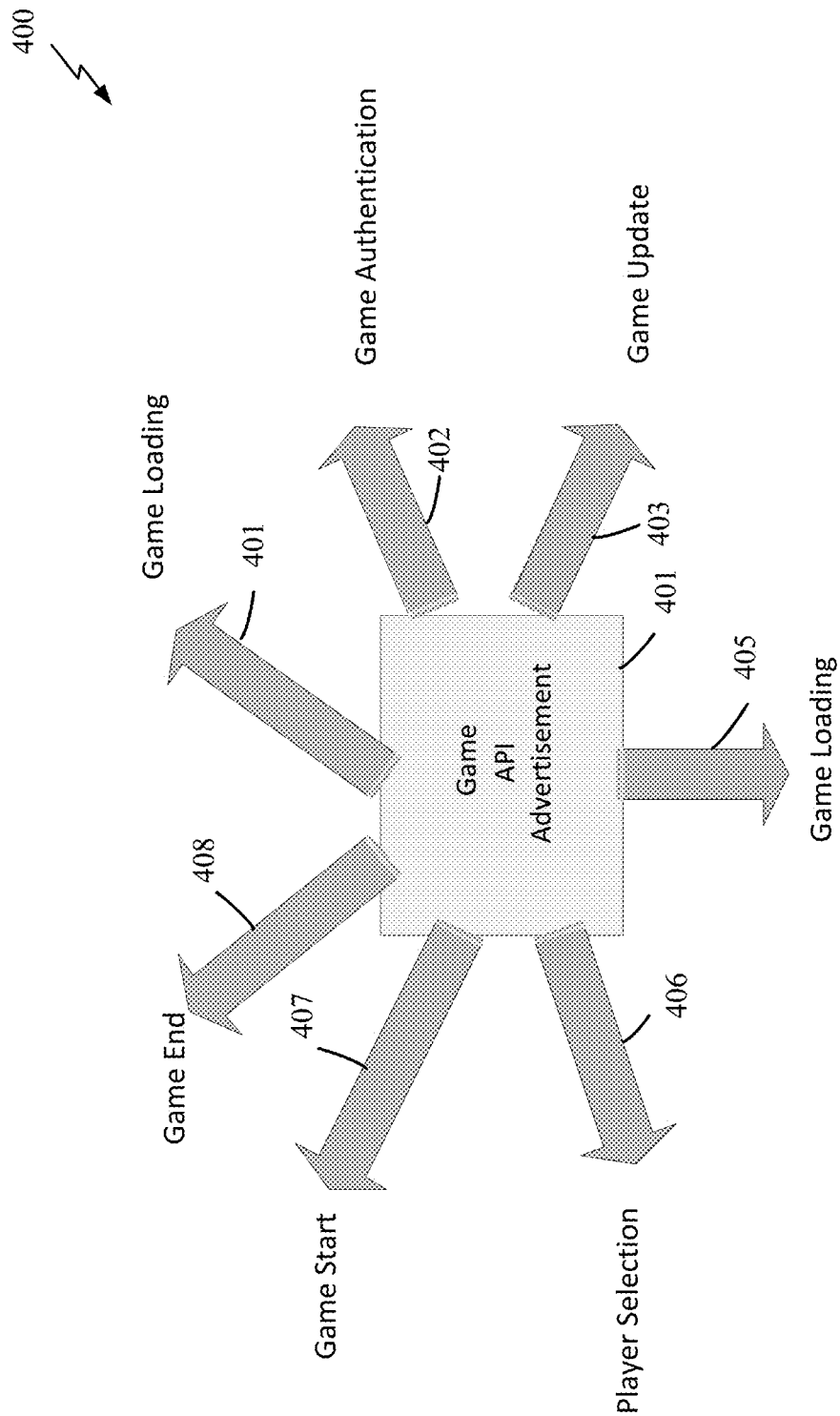
FIG. 4 is a schematic diagram of exemplary game states, according to aspects of the present disclosure.

FIG. 4 is a schematic diagram of an alternative example 400 of game state indicator based on a game API, according to aspects of the present disclosure. In one example aspect, FIG. 4 shows a game API 401, configured to indicate to an associated UE application module various states of a game application. An example of the associated UE application module is the Game-State Based NI Management Module The various game states may include a game loading state 4-1, a player authentication state 402, a game update state 403, a game loading state 405, a game player selection state 406, a game starting state 407, and the game complete state 408.

In one example aspect, the game API may be part of the game application that provides a hook-up point or an interface for other applications on the UE to communicate with the game application such as receiving state information of the game application. One example of such other application on the UE is the Game-State Based NI Management Module of the UE.

Figure 5:
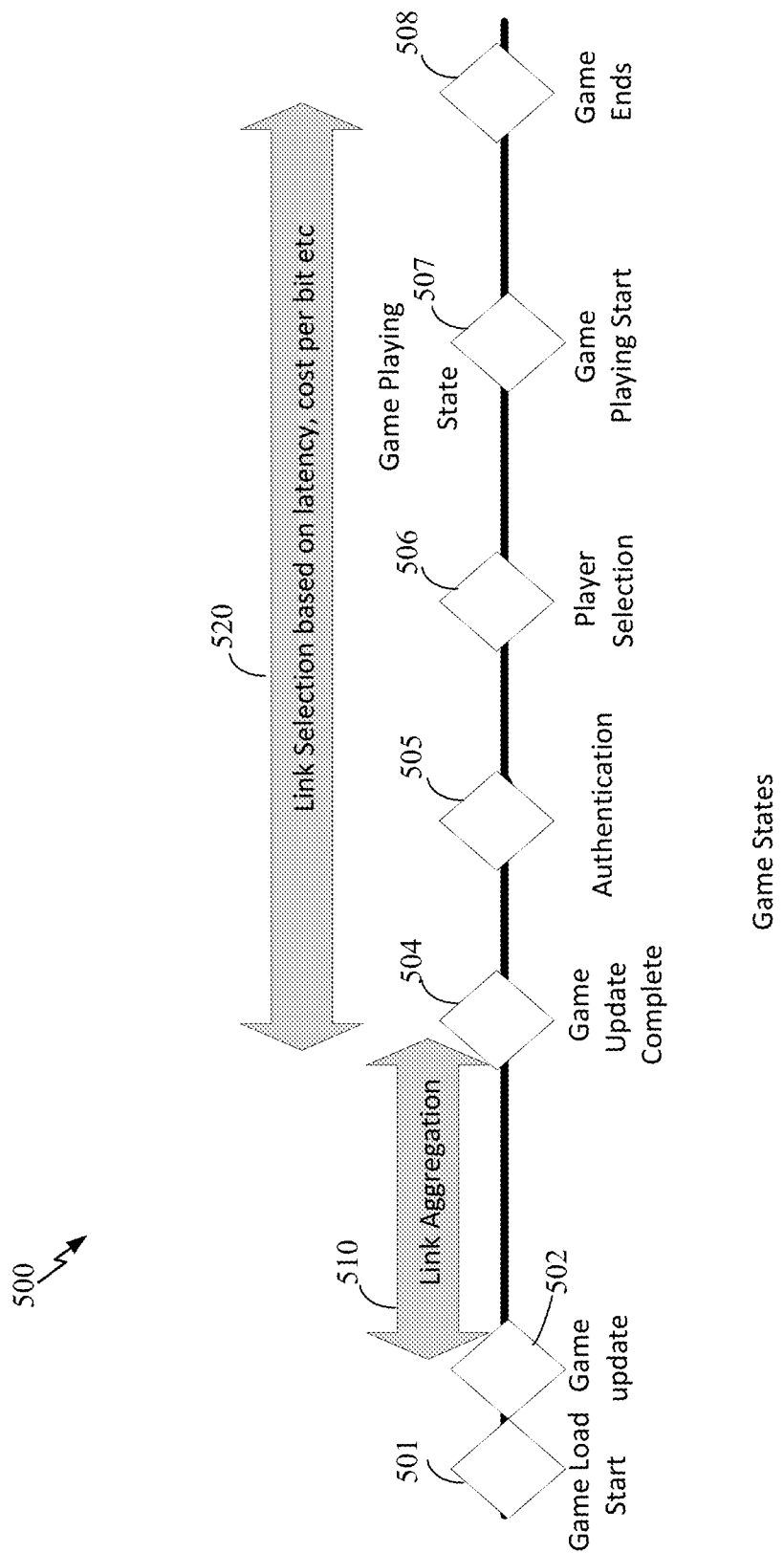
FIG. 5 is a schematic diagram of an exemplary game state progression, according to aspects of the present disclosure.

FIG. 5 is a flow chart 500 illustrating an example of determining one or more suitable network interfaces based on a determined game state, according to aspects of the present disclosure. In one example aspect, the flow chart 500 may be implemented by a UE game application which may include a game state based NI management module, such as the module 281 of FIG. 2. The flow chart 500 includes game load start state 501 and game update state 502.

During the game update 502, one or more game updates may be downloaded. A game update may take place on regular basis such as a daily to weekly basis with the sizes of the updates becoming increasingly large. In some case, it may take multiple minutes to complete game updating, depending on the network link speed. Accordingly, for this state, a suitable network interface may favor one that can accommodate a large game update in a timely manner and thus improve user's game experience.

Once entering the game update state 502, the UE game application may determine that the network interface may need switch to an interface with a link characterized by a high throughput. In one example aspect, one way to accomplish this is via link aggregation 510. The link aggregation 510 may refer to an enhancement of aggregating multiple links to form a bigger "link" or to supplement a current link with an additional link. In one aspect, a current Wi-Fi link may be supplemented with a cellular link to achieve higher throughput for applications such as game update, and web-browsing with heavy HTTP traffic.

In one example aspect, the flow chart 500 indicates that upon entering game update complete state, the UE game application enters various game states, including authentication 505, player selection 506, and game playing 507 and game end 508. While in the various game states, the UE game application may consider the link selection 520 as a suitable network interface which is based on link latency, cost per bit, and other criteria. For the game playing states, amount of data traffic may be relatively small compared to other game state, such as the game update state. As such, a reliable/stable network interface is preferred over an interface with emphasis on a high-throughput link. In one aspect, in the game playing start state 507, the UE game application may communicate with a game server to send the command/instructions, In one aspect, including game character moving/attacking information. For this state a UDP-based network interface may be suitable where the network latency is a major consideration over the throughput of the network link.

In one example aspect, determining a suitable NI for a determined game state may be implemented as a lookup table. The table may be indexed with various game states, and corresponding to each game state is a table entry including one or more suitable network interfaces. The lookup table may be preconfigured and updated dynamically. There may be other implementations for determining one or more suitable network interfaces based on a determined game state. One example of such an implementation is a switch decision algorithm, as shown in FIG. 6 and described below.

Figure 6:
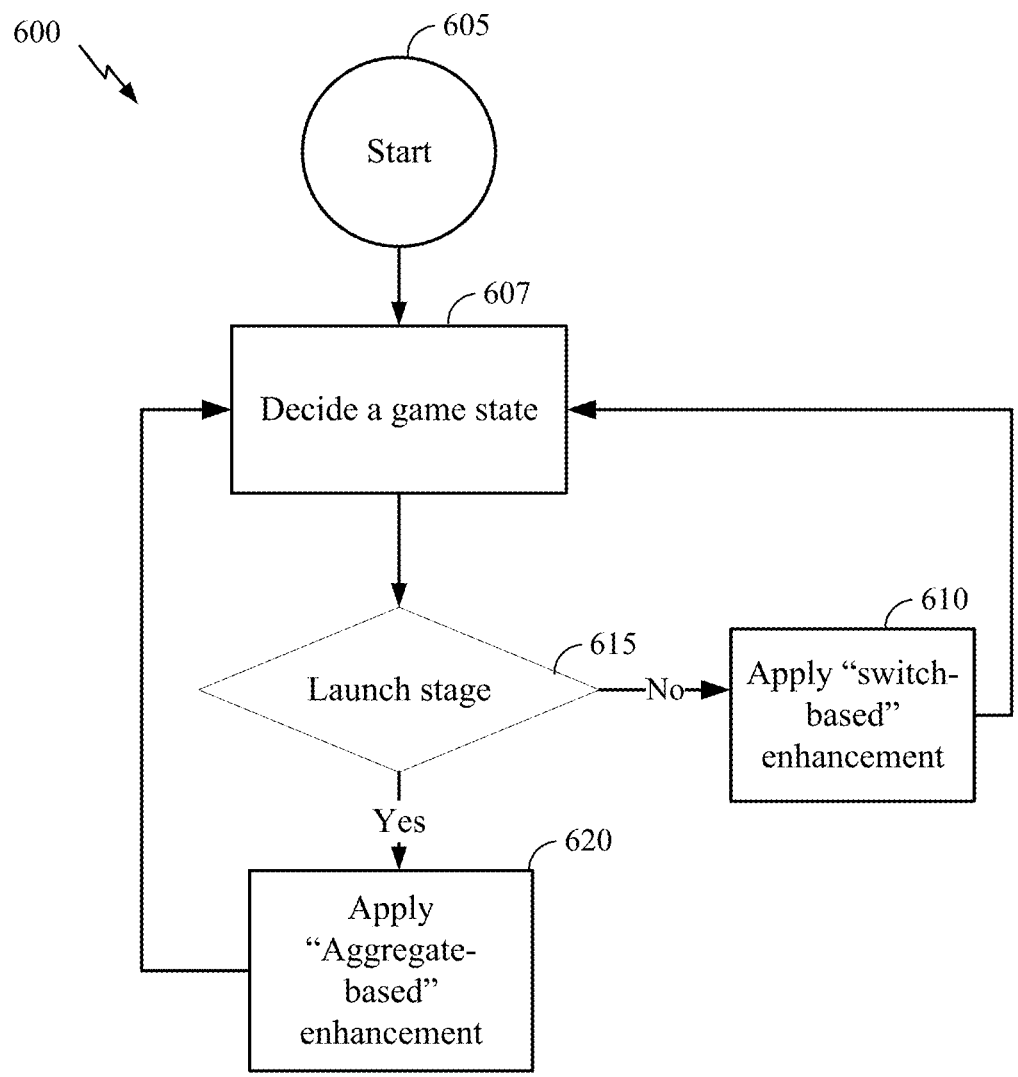
FIG. 6 is a flow chart of an exemplary switch decision algorithm based on the game states, according to aspects of the present disclosure.

FIG. 6 is a flow chart of an exemplary switch decision algorithm 600, according to aspects of the present disclosure. In one example aspect, the decision algorithm 600 may be implemented at a UE game application. The UE game application may include a Game-State Based Network Interface Management module, such as the Module 281 at UE 210a of FIG. 2.

In one example aspect, when the UE game application initiates at block 605, after determining a specific game state at 607, the UE game application may proceed to block 615 to determine if the determined game state is a game launch state. if yes, then the UE game application may proceed to block 620 to apply aggregation based enhancements to the network interface. The aggregation based enhancement may be the link aggregation of 510 of FIG. 5. Upon completing applying aggregation-based enhancement, the algorithm goes back to block 605 to determine a next game state.

In one example aspect, while in the game launch state, the UE game application may communicate with server to check and get game version, game update, performing tasks such as authentication of a player, downloading of user profile etc. For this game state, download speed may be major consideration and a link based on TCP may be suitable.

If the UE game application is not in the game launch state, it may indicate that the UE game application is in any of states ranging from the game update complete state 504, authentication state 505, player selection state 506, game playing start state 507 and game end state 508, the game application may apply a switch-based enhancement. The switch-based enhancement, in one example aspect, may refers to the link selection 520 of FIG. 5, which favor a network interface with low latency, and the low cost per bit over a network interface with a high throughput. Upon completing applying the switch-based enhancement, the algorithm goes back to the start block 605.

Figure 7:
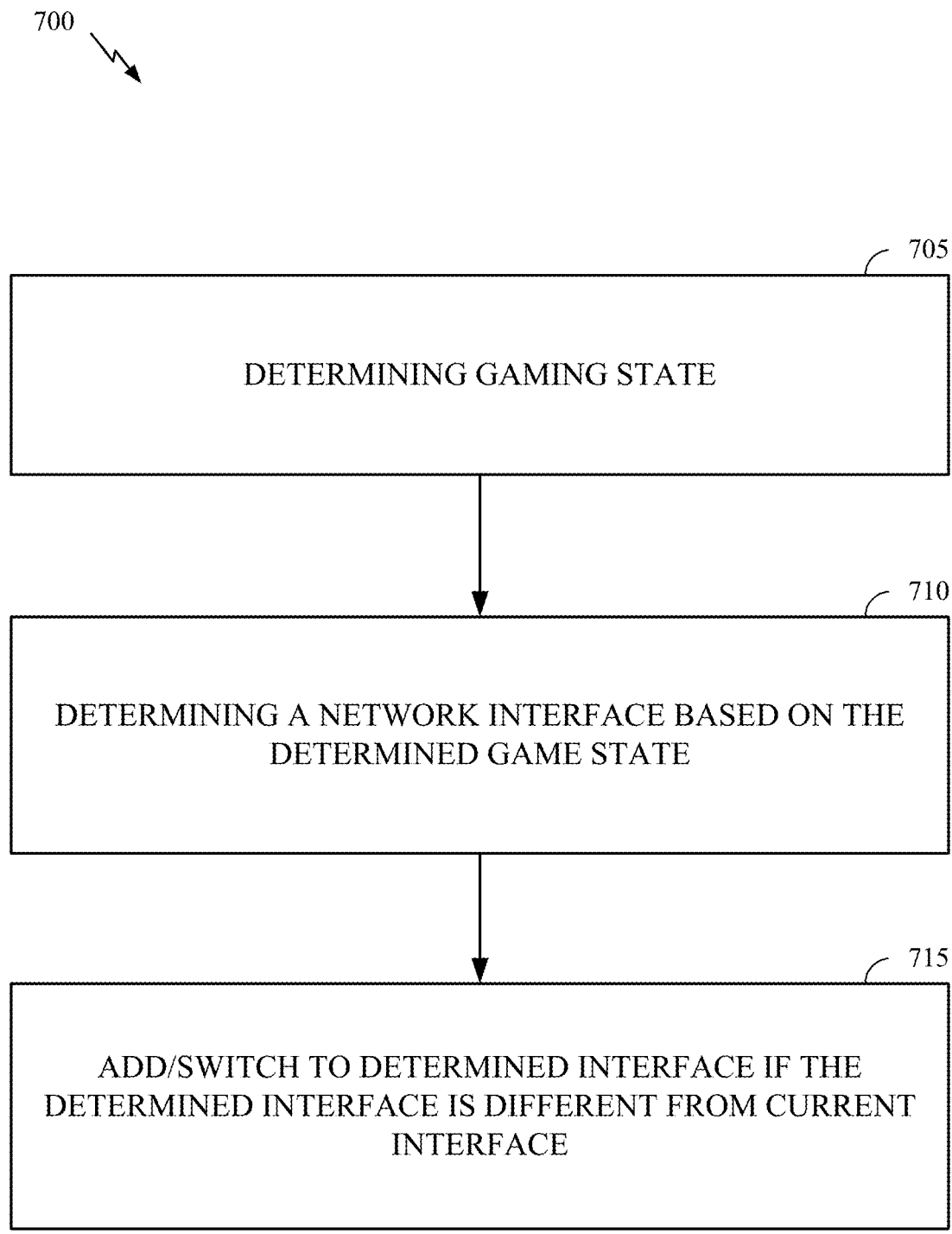
FIG. 7 is a flowchart of a method of wireless communication in accordance with various aspects of the present disclosure.

FIG. 7 is a flowchart illustrating a method 700 of wireless communication in accordance with various aspects of the present disclosure. The method 700 may be implemented at the UE 120 of FIGS. 1 and 2. The method 700 implements a process for a UE game application to dynamically manage its network interface based on a determined game state to improve online game performance and to enhance user game experiences. The method 700 may be performed by a 5G capable UE supporting multi-player online game, such as the UEs 120 of FIG. 1. The optional steps are indicated in dotted lines.

The method 700 includes at block 705 determining a game state based on at least one game state indicator. The UE, or more precisely, a UE game application may determine the game state based on at least one game state indicator. In one example aspect, the at least one game state indicator may be a predetermined timer and the UE receives a signal indicating that the timer has expired to indicate a new game state. In another example aspect, the at least one game state indicator is a game application API that may send a message indicating to the UE game application a game state or a game state transition. These are two example ways for the UE game application to determine a game state. There may be other ways in addition to the two methods described herein for the UE game application to determine a game state.

In one example aspect, determining a game state further comprises determining that the game state is a game update complete state if the game updating timer has expired, and a current game state is a game updating state. In one example aspect, determining the game state further comprises determining that the game state is a game playing start state indicated in the received game state indication. In one example aspect, the example game states may include a game loading start, a game updating, a game updating complete, a user authentication, a player selection, a game playing start, a game playing in progress, and a game playing complete. A new game state may be added as a need arises and an existing game state may become obsolete, as new type of mobile online game is played on the UE.

The method 700 includes at block 710 determining suitable network interface(s) based on the determined game state. In one example aspect, The UE may determine a suitable network interface by selecting a network interface with a set of characteristics suitable for the determined game state, where the set of characteristics may include at least an average data rate, an average peak rate, and an average connection latency. In another example aspect, the UE may determine the suitable network interface by selecting a corresponding network interface from a game state-network interface lookup table based on the determined game state. In one example aspect, there may be multiple interfaces for a particular game state.

The method 700 includes at block 715 adding or switching to the determined suitable network interface if the determined suitable network interface is different from a current network interface. In one example aspect, the UE may add a new interface if the suitable interface is being used for the first time. In another example aspect, the UE may add an additional network interface to an existing one, to supplement the existing interface, all depending the determined game state.

The UE may also add the interface into the game state-interface lookup table. If the determined suitable interface is different from the current interface, the UE may switch to the suitable interface. Switching to the suitable network interface may include setting up new connection to a game server using the suitable network interface and/or tearing down the current network interface.

The method 700 is for illustration purpose and shows one possible process for a network node to determine one or more network interface based on a determined game state. In practice, one or more steps shown in the illustrative flowchart for the method 700 may be combined with other steps, performed in any suitable order, performed in parallel (e.g., simultaneously or substantially simultaneously), or removed.

Figure 8:
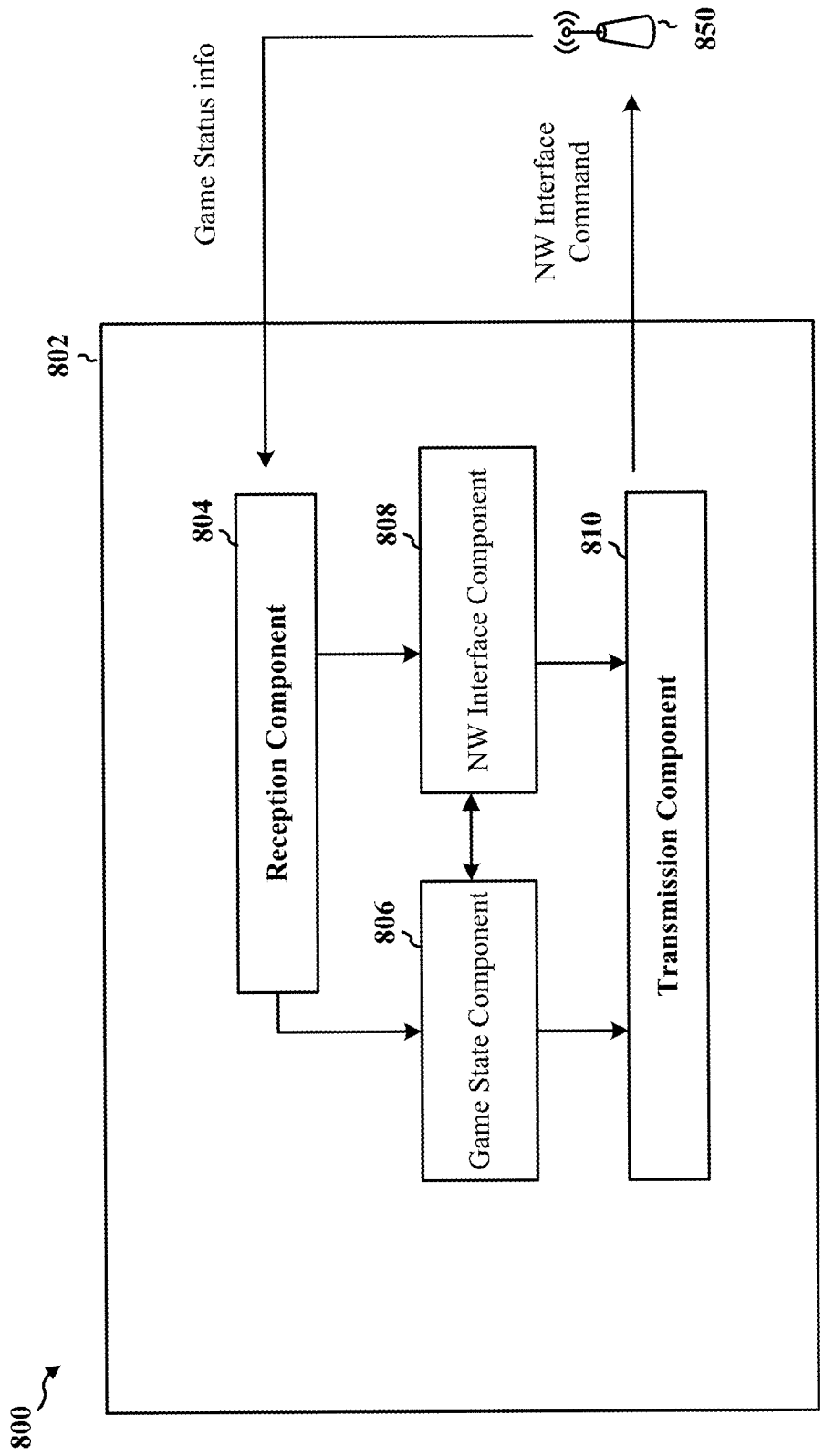
FIG. 8 is a conceptual data flow diagram illustrating the data flow between different means/components in an exemplary apparatus in accordance with aspects of the present disclosure.

FIG. 8 is a conceptual data flow diagram 800 illustrating the data flow between different means/components in an exemplary apparatus 802. The apparatus may be a 5G base station or a UE with a large number of antenna elements. The apparatus includes a reception component 804 that may receive game station information from a game server via a network node, a game state component 806 that may be configured to determine a game state based on a game state indicator, a network interface (NI) component 808 that may be configured to determine a suitable network interface and to add or switch to the determined suitable network interface and a transmission component 910 that is configured to network interface command and data to a game server via a 5G base station 850.

The apparatus may include additional components that perform each of the blocks of the algorithm in the aforementioned flowcharts of FIGS. 5 through 7. As such, each block in the aforementioned flowcharts of FIGS. 5 through and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
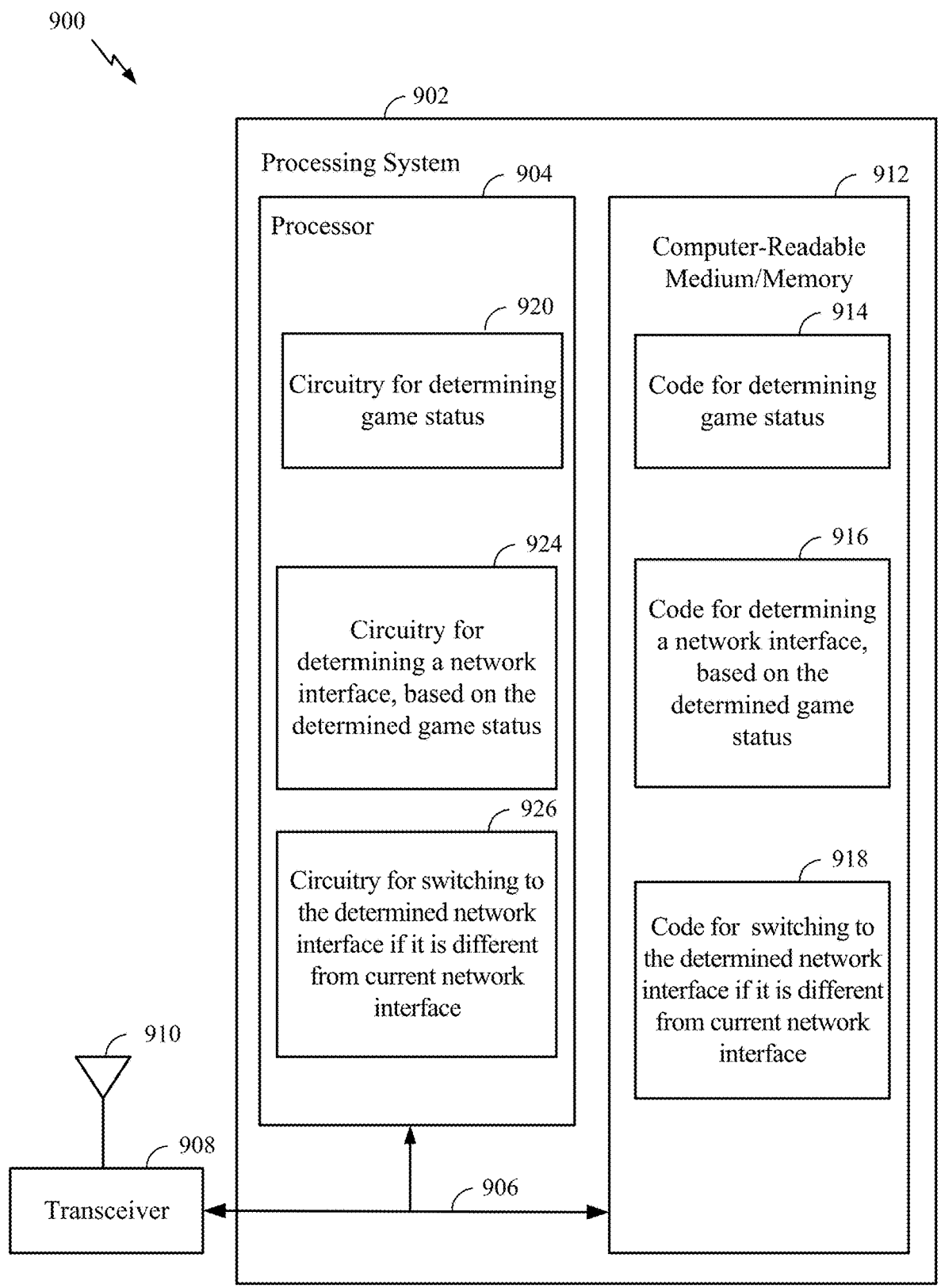
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 4 through 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for SLS. In certain aspects, computer-readable medium/memory 912 stores code 914 for determining a game state, code 916 for determining, based on the determined game state, and code 918 for switching to the determined network interface if it is different from the current network interface. In certain aspects, the processor 904 has circuitry configured to implement the code stored in the computer-readable medium/memory 912. The processor 904 includes circuitry 920 for determining a game state, circuitry 924 for determining a network interface based on the determined game state, and circuitry 926 for switching the determined network interface if it is different from the current network interface.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. In one aspect, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. In one aspect, such a computer program product may comprise a computer-readable medium having instructions stored (and/or encoded) thereon, the instructions being executable by one or more processors to perform the operations described herein. In one aspect, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. In one aspect, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a mobile user equipment (UE) having a display and running an online game, comprising:
 determining a game state of the online game running at the mobile UE based on at least one game state indicator;
 determining a suitable network interface for wirelessly communicating between the mobile UE running the online game and a game server, based on the determined game state;
 switching to the determined suitable network interface if the determined suitable network interface is different from a current network interface; and
 communicating with the game server via the determined suitable network interface.

2. The method of claim 1, wherein the suitable network interface comprises:
 a delay-sensitive network connection; or
 a capacity-sensitive network connection.

3. The method of claim 2, wherein
 the delay-sensitive network connection comprises a fast network interface with an average link latency below a predetermined threshold and includes a User Datagram Protocol (UDP) connection; and
 the capacity-sensitive network connection comprises a link with above a predetermined threshold or an aggregation of multiple links.

4. The method of claim 1, wherein the game state comprises at least one of
 a game loading start, a game updating, a game updating complete, a user authentication, a player selection, a game playing start, a game playing in progress, and a game playing complete.

5. The method of claim 1, wherein the at least one game state indicator comprises at least one of:
 a game updating timer; or
 a game application program interface (API).

6. The method of claim 5, wherein the determining of the game state comprises at least one of:
 receiving a game state indication from the game API; or
 receiving an indication that the game updating timer has expired.

7. The method of claim 6, wherein determining the game state further comprises:
 determining that the game state is a game update complete state if the game updating timer has expired, and a current game state is a game updating state; or
 determining that the game state is a game state indicated in the received game state indication.

8. The method of claim 1, wherein determining the suitable network interface comprises selecting a network interface with a set of characteristics suitable for the determined game state, where the set of characteristics comprises at least an average data rate, an average peak rate, and an average connection latency.

9. The method of claim 1, wherein determining the suitable network interface comprises selecting a corresponding network interface from a lookup table based on the determined game state.

10. The method of claim 1, wherein switching to the suitable network interface comprises:
 setting up new connection to the game server; and
 tearing down the current network interface.

11. An apparatus for wireless communications implemented at a mobile user equipment (UE) running an online game, comprising:
 a transceiver;
 a memory;
 a display; and
 at least one processor coupled to the memory and display and configured to:
  determine a game state of the online game running at the mobile UE based on at least one game state indicator;
  determine a suitable network interface for wirelessly communicating between the mobile UE running the online game and a game server, based on the determined game state;
  switch to the determined suitable network interface if the determined suitable network interface is different from a current network interface; and
  communicate with the game server via the determined suitable network interface.

12. The apparatus of claim 11, wherein the suitable network interface comprises:
 a delay-sensitive network connection; or
 a capacity-sensitive network connection.

13. The apparatus of claim 12, wherein
 the delay-sensitive network connection comprises a fast network interface with an average link latency below a predetermined threshold and includes a User Datagram Protocol (UDP) connection; and
 the capacity-sensitive network connection comprises a link with a throughput above a predetermined threshold or an aggregation of multiple links.

14. The apparatus of claim 11, wherein the game state comprises at least one of
 a game loading start, a game updating, a game updating complete, a user authentication, a player selection, a game playing start, a game playing in progress, and a game playing complete.

15. The apparatus of claim 11, wherein the at least one game state indicator comprises at least one of:
 a game updating timer; or
 a game application program interface (API).

16. The apparatus of claim 15, wherein the at least one processor is further configured to determine the game state by at least one of:
 receiving a game state indication from the game API; or
 receiving an indication that the game updating timer has expired.

17. The apparatus of claim 16, wherein the at least one processor is further configured to determine the game state
 by determining that the game state is a game update complete state if the game updating timer has expired, and a current game state is a game updating state; or
 by determining that the game state is a game state indicated in the received game state indication.

18. The apparatus of claim 11, wherein the at least one processor is further configured to determine the suitable network interface by selecting a network interface with a set of characteristics suitable for the determined game state, where the set of characteristics comprises at least an average data rate, an average peak rate, and an average connection latency.

19. The apparatus of claim 11, wherein the at least one processor is further configured to determine the suitable network interface by selecting a corresponding network interface from a lookup table based on the determined game state.

20. The apparatus of claim 11, wherein the at least one processor is further configured to switch to the suitable network interface by:

setting up new connection to the game server; and tearing down the current network interface.

21. An apparatus for wireless communication at a mobile user equipment (UE) having a display and running an online game, comprising:

means for determining a game state of the online game running at the mobile UE based on at least one game state indicator;

means for determining a suitable network interface for wirelessly communicating between the mobile UE running the online game and a game server, based on the determined game state;

means for adding/switching to the determined suitable network interface if the determined suitable network interface is different from a current network interface; and means for communicating with the game server via the determined suitable network interface.

22. The apparatus of claim 21, wherein the suitable network interface comprises:

a delay-sensitive network connection; or a capacity-sensitive network connection.

23. The apparatus of claim 22, wherein the delay-sensitive network connection comprises a fast network interface with an average link latency below a predetermined threshold and includes a User Datagram Protocol (UDP) connection; and the capacity-sensitive network connection comprises a link with a throughput above a predetermined threshold or an aggregation of multiple links.

24. The apparatus of claim 21, wherein the game state comprises at least one of a game loading start, a game updating, a game updating complete, a user authentication, a player selection, a game playing start, a game playing in progress, and a game playing complete.

25. The apparatus of claim 21, wherein the at least one game state indicator comprises at least one of:

a game updating timer; or a game application program interface (API).

26. The apparatus of claim 25, wherein the means for determining the game state comprises at least one of:

means for receiving a game state indication from the game API; or means for receiving an indication that the game updating timer has expired.

27. The apparatus of claim 26, wherein means for determining the game state further comprises:

means for determining that the game state is a game update complete state if the game updating timer has expired, and a current game state is a game updating state; or means for determining that the game state is a game state indicated in the received game state indication.

28. The apparatus of claim 21, wherein the means for determining the suitable network interface comprises means for selecting a network interface with a set of characteristics suitable for the determined game state, where the set of characteristics comprises at least an average data rate, an average peak rate, and an average connection latency.

29. The apparatus of claim 21, wherein the means for determining the suitable network interface comprises means for selecting a corresponding network interface from a lookup table based on the determined game state.

30. The apparatus of claim 21, wherein means for switching to the suitable network interface comprises:

means for setting up new connection to the game server; and means for tearing down the current network interface.

* * * * *